Jan. 24, 1933.                P. ZURCHER                 1,895,063
                             CRACKING PROCESS
                             Filed May 7, 1929
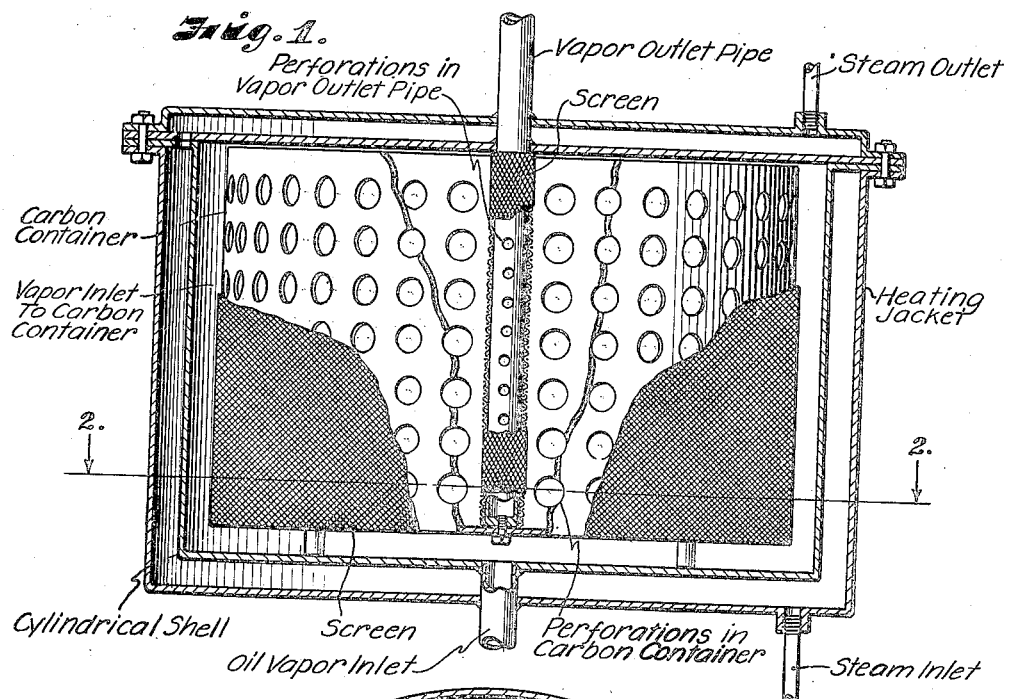
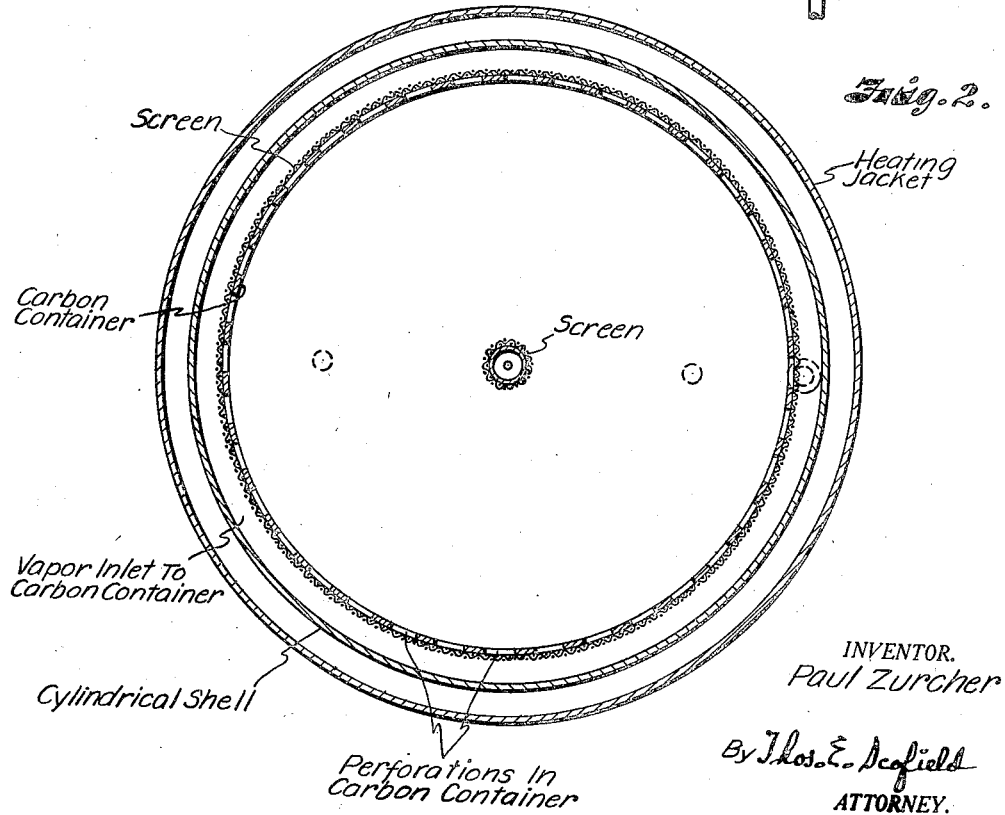
INVENTOR.
Paul Zurcher
By Thos. E. Scofield
ATTORNEY.

Patented Jan. 24, 1933

1,895,063

UNITED STATES PATENT OFFICE

PAUL ZURCHER, OF FLORENCE, COLORADO, ASSIGNOR, BY MESNE ASSIGNMENTS, TO CONTINENTAL OIL COMPANY, OF PONCA CITY, OKLAHOMA, A CORPORATION OF DELAWARE

CRACKING PROCESS

Application filed May 7, 1929. Serial No. 361,264.

The present invention relates to the cracking of hydrocarbons, and has particular reference to the use of activated carbon as a catalyst.

In the January 1928 (vol. 10, No. 8) copy of Pure Oil News, published by the Pure Oil Company, of Columbus, Ohio, there is described in detail the so-called Gyro process for cracking oil. The essential feature of that process, to which this invention relates, is the cracking step. The Gyro process may use any oil that can be vaporized. The process as described involves the subjection of vaporized oil admixed with steam to the action of a catalyst at a high temperature and at substantially atmospheric pressure. The catalyst used is iron oxide carried by a core of concrete disposed within a tube through which the vapors pass. Suitable equipment is described for producing vapor from the oil employed and the unvaporized portions being withdrawn as a fuel oil. Other equipment is described for scrubbing the gases from the catalytic conversion, for separating the desired constituents from it, and for recovering the gas which is formed in considerable quantity in the conversion process. The Gyro process is operated at about 592° C. Approximately 3% by weight of steam is introduced with the oil that is evaporated.

The present invention is based upon the discovery that activated carbon may be used as a catalyst in a process similar to the Gyro with improved results, no steam being employed. I have found that a lower conversion temperature of the catalyst may be maintained, that less gas is produced in the process, that products of low sulphur content may be obtained, that the carbon catalyst may be used almost indefinitely, and that other features of importance are to be observed. The process of this invention may be carried out by passing vapors of the hydrocarbon at substantially atmospheric pressure, over the carbon catalyst. The temperature of the catalyst may be controlled according to the maximum boiling point of the oil to be treated, and should be somewhat higher in order to prevent condensation on the carbon. The temperature should of course not be below the cracking activity of the carbon that is employed. The temperature may be further controlled in accordance with the character of product desired, as will hereinafter appear.

In conducting the process a long thin column of catalytic carbon may be employed, such for example as one about 30 cm. long and about 7.5 cm. in diameter in a suitable container, such as an iron or tile container, holding about one kilogram of carbon, in granular form, and provided with a suitable heating device. Units of this character may be multiplied or increased in size in accordance with the capacity of the converter in which such units are located and heated.

In the accompanying drawing, Figure 1 is an elevation partly in section, of one method of carrying out my invention.

Figure 2 is a section taken on the line 2—2 of Figure 1.

As can be seen from the drawing, the oil vapor enters and passes through the activated carbon which is placed in the carbon container.

As an activated carbon I prefer to use that form prepared from petroleum coke according to the specifications of my copending applications Serial No. 299,441, filed August 13, 1928 and Serial No. 299,442, filed August 13, 1928, and the results hereinafter described refer to use of active carbon so prepared. However, I do not intend to limit this invention to carbons activated or prepared by my processes above referred to, although I believe that many of the improved results are due largely to the peculiar character of activity of such carbon. In fact I have determined that other carbons are too highly active in this process and cause gas formation. Hence, I prefer the special carbons above referred to. The particular carbon to which I refer is that which is prepared as active carbon by the action of phosphoric acid and steam on carbon with or without hydrocarbon products present in the untreated carbon, as described in detail in the application Serial No. 299,441, filed August 13, 1928. As an example of other carbons I may use those activated by steam alone.

In the process hereinafter described I have employed vapors of a paraffin base oil of 22.9° A. P. I. having an initial boiling point of 289° C., but any hydrocarbon oil within the gravity range between 10° to 50° A. P. I. and having a boiling point above 100° C. may be cracked by my novel process. I have found that the carbon is active at temperatures as low as 300° C. and that it may be used at this or any lower temperature at which the carbon exhibits an active property to crack hydrocarbon vapors. I have found that the temperatures of the carbon may be increased up to a temperature of about 510° C. without the formation of any appreciable amounts of gas in the process. Above this point the gas formation becomes increasingly appreciable.

Important variables with which I have been concerned include the carbon temperature, and the rate of flow of the vapor through the catalyzer. Concerning these factors together, it may be stated from my observations that at a given temperature the cracked product has the same percentage of uncaturated hydrocarbons independently of the rate of flow. As the carbon temperature increases the content of unsaturated hydrocarbons in the product also increases. For example, at a carbon temperature of 400° C. and rates of flow through the column described (expressed in cc. per hour of liquid vaporized) of 103, 171, 323 and 528, the unsaturates were found respectively to be 26%, 27%, 28% of the product. At 450° C. four different rates of flow from 121 to 463 cc. per hour all gave 35% unsaturates in the product.

I have also found that increased carbon temperature causes an increase in the percentage of material that is cracked, and a decrease in the gravity of the resulting gasoline. The following table shows comparative results:

Table I

| Carbon temperature | Per cent cracked | Gasoline gravity | Per cent unsaturates | Loss and gas |
|---|---|---|---|---|
| Centigrade | | | | |
| 426° | 36 | 57.5 | 22 | 3 |
| 454° | 43 | 55.5 | 26 | 4.5 |
| 482° | 43 | 54.5 | 34 | 2.5 |
| 510° | 46 | 52.5 | 42 | 2.5 |
| 538° | 62 | 50.0 | 48 | 12.0 |

As the rate of flow of vapor is increased the percentage of cracked products decreases, or in other words the cracking efficiency or chemical efficiency is lowered, but the quantity per unit of time is increased, or in other words, the apparatus efficiency is increased. For example, at the rate of flow of 121 cc. per hour at 450° C. the yield was 37.4 cc. of gasoline per hour (52.8° A. P. I.) compared with 117 cc. of gasoline (53.4° A. P. I.) obtained with a rate of flow of 463 cc. per hour.

In order best to illustrate the invention the following specific examples are given in addition to the data above supplied.

*Example I.*—Through the carbon column above described, held within 5° of 480° C., I pass vapors of the oil referred to above at the rate of 200 cc. per hour, the pressure being substantially atmospheric, considering of course that a head pressure of about 6 mm. of mercury may be maintained to produce the flow through the carbon. In about 5 hours time, or after 1000 cc. of the oil is so treated, the recovery is found to be

|  | Cubic centimeters |
|---|---|
| Distillate | 655 |
| Residues | 267 |
| Recovered with steam | 50 |
| Loss | 28 |
| Total | 1000 | of this material the distillate showed 29.8% gasoline and 13% kerosene, or 42.8% cracked products. In the products 32% of unsaturates was found.

*Example II.*—Under the same conditions as in Example I except for a change of temperature to 537° C. and a rate of flow of 250 cc. per hour the recovery was

|  | Cubic centimeters |
|---|---|
| Distillate | 536 |
| Residues | 296 |
| Gas and loss | 168 |

Of this the distillate showed 49.2% gasoline and 14.6% kerosene, making 63.8% cracked products. Unsaturates amounted to 48%.

*Example III.*—A further example, as above, employing a temperature of 400° C. and a rate of flow of 100 cc. per hour gave a yield of 35.1% gasoline and 17.3% kerosene, totalling 52.4% cracked products. Unsaturates were 28%.

*Example IV.*—Employing the same conditions as in Example III with a rate of flow of 528 cc. per hour the result was 18.3% gasoline and 8.5% kerosene, or 28.8% cracked products. Unsaturates were 28%.

The process is advantageous from the standpoint of lower conversion temperatures. The gas formation is at a minimum at the low and efficient cracking temperatures, and is far less in proportion than what takes place in the Gyro process. The quality and properties of the gasoline obtained at lower temperatures is different from that obtained at higher temperatures. Not until a temperature somewhat above 500° C. is obtained is the gas or fume formation of any consequence. The carbon may be used over long periods without contamination or loss in efficiency. Although I have found the carbon to be coated with a gray film, its efficiency is not seemingly impaired. Should it become contaminated it may be regenerated in situ by my process described in copending application Serial No. 299,441, filed August 13, 1928. Such contamination may result from the carbon being accidentally soaked with oil, or from the decomposition of sulphur products in the vapors. According to my copending application Serial No. 299,443, filed August 13, 1928 the carbon is also active to render the sulphur more easily removable from the distillate.

Although I have described and illustrated the process with reference to vapors at substantially atmospheric pressure, it will be readily appreciated by those skilled in the art that the process is not limited to the use of atmospheric pressures. It is preferred for operating advantages to use substantially atmospheric pressure, and it is to be understood that higher pressure tends to cause liquefaction at lower temperature, and hence in order to maintain vapors for certain oils, a higher temperature may be required as the pressure is increased. In the appended claims I aim to include such variations of the process as will be obvious to those skilled in the art.

I claim:

1. The method of cracking hydrocarbons to produce lighter fractions in the nature of gasoline which comprises subjecting vapors of the hydrocarbon at substantially atmospheric pressure to the catalytic action of carbon heated to a temperature of 300° C. to 510° C. and previously activated by the combined action of steam and phosphoric acid.

2. The method of cracking hydrocarbons into heavier and lighter constituents of an increased degree of unsaturation which comprises subjecting vapors of the hydrocarbon at substantially atmospheric pressure to the action of heated carbon at temperatures below substantially 510° C. and above 300° C., the carbon being made from petroleum coke and previously activated by the combined action of steam and phosphoric acid.

3. The method of cracking hydrocarbons which comprises subjecting vapors of the oil at substantially atmospheric pressure to the action of carbon, heated to a temperature of 300° C. to 510° C. and previously activated by the combined action of steam and phosphoric acid, to catalyze the decomposition without removing the sulphur.

4. The method of cracking hydrocarbons into heavier and lighter constituents of an increased degree of unsaturation which comprises subjecting vapors of the oil at substantially atmospheric pressure to the catalytic action of heated carbon at temperatures below substantially 510° C. and above 300° C., the carbon having been previously activated by the combined action of steam and phosphoric acid.

PAUL ZURCHER.